UNITED STATES PATENT OFFICE 2,486,493

OIL COMPOSITIONS

Anthony J. Revukas, Cranford, N. J., assignor to Tidewater Associated Oil Company, New York, N. Y., a corporation of Delaware No Drawing. Application January 9, 1947, Serial No. 721,145

11 Claims. (Cl. 252—49.8)

The present invention relates to oil compositions, and, more particularly, to compositions containing an oil in major proportion, a minor proportion of an oil-soluble polymerized ester of the acrylic series, and a minor proportion of an oil-soluble ester of a phosphorus acid.

Oil-soluble polymerized esters of the acrylic series are known to be valuable additives for oils to impart certain desired characteristics thereto, as for example, to depress pour point, to improve viscosity index, to maintain lubricating surfaces substantially free of undesirable gum or other deposits, and the like. However, although incorporation of such additives in oils impart certain desirable properties thereto, under some conditions, as for example wherein water or steam can come into contact with the additive-containing oil, the polymerized esters of the acrylic series tend to induce emulsification, thus interfering with the performance efficiency of the oil compositions.

It is an object of the present invention to provide improved oil compositions, containing polymerized esters of the acrylic series, that are imparted with emulsification-suppressing characteristics while at the same time retaining the beneficial properties imparted thereto by the polymerized esters.

Generally speaking, the oil compositions particularly adapted for treatment in accordance with the present invention are mineral oils containing polymeric esters of the acrylic series, such esters generally having the basic structure:

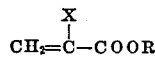

wherein X represents a hydrogen atom or an alkyl group, e. g., a methyl group, and R is a monovalent hydrocarbon radical. In general, when employing such polymers in oils, and the simple esters are used, R preferably contains more than four carbon atoms as use of radicals containing such a relatively high number of carbon atoms usually provides improved solubility of the polymers in oils. Hence, particularly suitable polymers of the simple esters include those of the foregoing formula wherein R contains at least four and preferably from eight to eighteen carbon atoms. Typical examples of such polymers of the acrylic series that are employed in oil compositions include amyl, hexyl, cyclohexyl, decyl, cetyl, octadecyl, and the like, esters of acrylic or α-methacrylic acids. Furthermore, mixtures of such polymers may likewise be used. In addition to the polymers of the simple esters, as hereinbefore discussed, their copolymers may also be used. In general, such adjuvants preferably comprise copolymers of esters having an alcohol group of not more than five carbon atoms and of esters derived from an alcohol group of more than five carbon atoms, as such copolymers generally have improved solubility characteristics in oils. The amount of polymeric esters of the acrylic series incorporated into oils may be varied depending on several factors, as for example, the type of oil and the particular polymeric ester used, the solubility of the polymers in the oil, and the like, but for most purposes, the amount of polymeric esters used generally varies from about 0.1% to about 5% based upon the weight of the oil.

The present invention is based upon the discovery that oil-soluble phosphate esters, particularly the aliphatic acid phosphate esters, and mixtures thereof are effective emulsion-suppressants for oils containing polymeric esters of the acrylic series that have a tendency to induce emulsification of the oils. In broad aspect, the present invention embodies the use of partially esterified and completely esterified derivatives of phosphoric acids, although in a preferred embodiment, the invention comprises use of partially esterified derivatives of phosphorus acids, such derivatives being characterized by having at least one hydroxyl group linked directly to a phosphorus atom. With reference to the fully esterified phosphates, I prefer to employ oil-soluble trialiphatic phosphates, such as derived from orthophosphoric acid, and which are illustrated by tributyl phosphate, trioctyl phosphate, and the like. With reference to partially esterified phosphates, suitable examples thereof include mono-aliphatic esters, as for example, monoamyl-, monobutyl-, monooctyl-, monolauryl-, acid phosphates, as well as dialiphatic esters, as for example, dibutyl-, di-2-ethylhexyl-, dilauryl-, acid phosphates, and the like. Likewise, mixtures of the foregoing phosphate esters may also be used in oils to suppress the emulsifying tendency imparted by the presence therein of polymeric esters of the acrylic series.

In order to further describe my invention, and to illustrate certain embodiments thereof showing the effective demulsifying characteristics imparted by the phosphate esters embodied herein when incorporated into oils containing polymeric esters of the acrylic series, several examples are set forth hereinafter in Table I. In each of the examples, the procedure employed for determining demulsifying characteristics was in accordance with Test procedure A as set forth hereinafter.

Test procedure A

The apparatus employed comprises a motor-driven mixer, a 100 ml. graduate, and a constant temperature bath.

Eighty ml. of the test composition consisting of 40 ml. of test oil and 40 ml. of distilled water are poured into the graduate and the composition is brought to a temperature of about 130° F. When the test composition reaches this temperature, it is stirred for 5 minutes at 1500 revolutions per minute while maintaining the 130° F. temperature whereby the composition is emulsified. After the 5 minute stirring is completed, the emulsified composition is maintained at the 130° F. temperature without additional agitation. The test composition is observed at 5 minute intervals up to a 60-minute period. At each interval, it is noted whether the emulsion has been completely separated into a layer of water and a layer of oil, or whether an oil-water emulsion is still present. If the emulsion has not been completely broken, the amount that is present is recorded as "milliliters of cuff" by direct reading on the graduate at the 30 minute and 60 minute readings. When emulsion is present, the test composition comprises a bottom layer of water, a top layer of oil, and an intermediate layer of emulsion which is recorded as "milliliters of cuff."

the acrylic series (as shown by test No. 2) and was subjected to the same test conditions, severe emulsification occurred as evidenced by the presence of 63 ml. and 57 ml. of emulsion, out of the original 80 ml. of test composition, at the 30 and 60 minute readings respectively. When, in accordance with the present invention, the composition of test No. 2 also contained a phosphate ester, e. g., a mixture of mono- and di-lauryl acid phosphate or tributyl phosphate (as shown by test Nos. 3 to 10 inclusive), the emulsions induced by the polymeric ester were either quickly resolved or, when any emulsion was present at the 60-minute reading, the amount was markedly less than the 63 and 57 ml. of emulsion obtained in test No. 2. Thus, the examples show that for the particular test compositions of the foregoing examples, minor amounts, e. g., about 0.02 to 0.5% of lauryl acid ortho phosphates or tributyl ortho phosphate are effective emulsion-suppressants for oils, containing polymeric esters of the acrylic series, having emulsion-inducing characteristics imparted thereto by the polymeric esters.

As stated hereinbefore, the present invention in broad aspect embodies the use of phosphate esters, particularly aliphatic phosphate esters, as emulsion-suppressants for the acrylic polymer-containing oils embodied herein. However, in

Table I

| Test No. | Test Composition, Equal Parts by Volume | Demulsification Agent | Percentage of Demulsification Agent based on Weight of Oil | Results Employing Test Procedure A | |
|---|---|---|---|---|---|
| | | | | 30 Minute Reading | 60 Minute Reading |
| 1 | Turbine Lubricating Oil and Water | None | None | Complete resolution in 6 minutes. | |
| 2 | Same as Test No. 1 except that the Turbine Oil contained emulsion inducing copolymer of acrylic series. | do | None | 63 ml. of cuff | 57 ml. of cuff. |
| 3 | Same as Test No. 2 | A solution comprising about 2 parts dilauryl acid ortho phosphate and 1 part monolauryl acid ortho phosphate by weight. | 0.5 | 6 ml. of cuff | 5 ml. of cuff. |
| 4 | do | do | 0.2 | Complete resolution in 13 minutes. | |
| 5 | do | do | 0.1 | Complete resolution in 11 minutes. | |
| 6 | do | do | 0.05 | Do. | |
| 7 | do | do | 0.02 | Complete resolution in 22 minutes. | |
| 8 | do | do | 0.4 | 3 ml. of cuff | 3 ml. of cuff. |
| 9 | do | do | 0.3 | 1 ml. of cuff | 1 ml. of cuff. |
| 10 | do | Tributyl phosphate | 0.05 | Complete resolution in 10 minutes. | |

In the foregoing table, the test composition of test Nos. 2 to 10 inclusive contained a polymeric ester of the acrylic series. Such test compositions were prepared as follows:

An initial solution was prepared by dissolving in an oil of turbine lubricating grade, 3% by weight of a composition comprising about 40% by weight of a copolymer type resin of methacrylic acid esters in which one of the alcohol components is lauryl alcohol dissolved in about 60% by weight of a Mid-Continent neutral oil. The resulting solution was then admixed with water in accordance with Test procedure A to form the test composition as set forth in the table.

With reference to test Nos. 3 to 10 inclusive, wherein the test compositions also contained phosphate esters, the esters were added to the initial solution containing the oil and polymeric ester prior to admixture of the resulting solution with water in accordance with Procedure A.

Referring to the examples in Table I, test No. 1 demonstrates that the turbine oil employed has excellent demulsification capabilities in that when admixed with water and tested in accordance with Procedure A, the emulsion obtained was resolved in six minutes. However, when the same oil-water composition also contained a polymeric ester of my practice of the present invention, I employ partially esterified phosphates in preference to the completely esterified phosphates, as under certain conditions, the partially esterified phosphates provide more consistent demulsifying properties than the fully substituted esters over wider ranges of concentration of the esters based on the weight of the oil. Accordingly, in a preferred embodiment, the present invention comprises the use of mono- and di-aliphatic acid esters of phosphorus acids, e. g., orthophosphoric acid, as typified by monoamyl-, monobutyl, monooctyl-, monolauryl-, acid phosphates, di-aliphatic acid phosphates as for example, dibutyl-, di-2-ethylhexyl-, dilauryl-, acid phosphates, and fully esterified trialiphatic phosphates that readily hydrolyze to provide partially substituted acid phosphates. With reference to the fully esterified phosphates, esters that have suitable oil-solubility characteristics and which contain an alkyl group containing a relatively low number of carbon atoms are preferred, as for example, trialkyl esters such as tributyl phosphate. Such esters generally hydrolyze readily so that when incorporated in oils containing polymeric esters of the acrylic series, and the oil composition is subsequently admixed with water, hydrolysis occurs to a degree sufficient to provide highly effective emulsion-suppressing properties. Thus, for example, tributyl phosphate has under certain conditions provided more effective demulsifying characteristics than esters of the same series, e. g., trioctyl phosphate, that do not contain an alkyl group having a relatively low number of carbon atoms.

Although the examples set forth hereinbefore demonstrating the effectiveness of the demulsifiers embodied herein set forth certain concentrations thereof in the oil compositions, my invention is not limited thereto, as the concentration of demulsifiers based on the weight of the oil may be varied depending on various factors and yet provide satisfactory results. Thus, for example, the concentration of demulsifier that should be employed, in order to provide optimum results, is dependent on various factors, as for example, the solubility characteristics of the demulsifier in a particular oil composition, the conditions to which the oil composition is to be subjected, the degree of demulsification or emulsion-suppressing properties desired, and the like. For most purposes, however, minor amounts of demulsifier, based on the weight of oil impart effective demulsifying characteristics to oils containing polymeric esters of the acrylic series. For example, as is shown in the foregoing examples, amounts of lauryl acid ortho phosphates and tributyl phosphate as low as 0.02 to 0.5% by weight, based on the weight of oil, provide effective demulsification although concentrations varying therefrom, preferably in excess of 0.5%, may be employed as hereinbefore stated.

In practicing my invention, the phosphate esters embodied herein may be employed per se, or as mixtures thereof, for imparting emulsion-suppressing characteristics to oils, containing polymeric esters of the acrylic series, that are enhanced in emulsifying properties due to the presence of the polymeric esters. Furthermore, the phosphate esters may be added to oil compositions as solutions or dispersions in suitable vehicles therefor, as for examples, mineral oils, including Diesel fuels, lubricating oils, turbine oils and the like, the vehicle employed being preferably selected from those compatible with the oil to undergo treatment and which do not deleteriously affect the oil composition. Still further, the phosphate ester demulsifiers may be employed in combination with polymeric esters of the acrylic series, or as solutions or dispersions of such combinations in suitable vehicles, as for example, mineral oils and fractions thereof. In this manner, combination additives may be provided for oils to impart thereto the desired properties of the acrylic series polymers and at the same time impart demulsifying characteristics to suppress the emulsion-inducing tendency of the polymers. For purposes of illustration, a specific example of such a combination additive is to incorporate a phosphate ester, as embodied herein, in a polymer-containing oil such as employed in preparing the test compositions set forth in the foregoing examples, thus providing a combination additive containing an oil, e. g., mineral oil, a copolymer of esters of the acrylic series, and a phosphate ester, e. g., acid lauryl phosphates, tributyl phosphate and the like.

Although the present invention has been described in conjunction with certain preferred embodiments thereof, those skilled in the art will readily recognize that variations and modifications can be made. Such variations and modifications are to be considered to be within the purview of the specification and the scope of the appended claims.

I claim:

1. A mineral oil composition comprising a mineral oil having dissolved therein a small amount, sufficient to improve the lubricating characteristics of said oil while imparting to said oil an increased tendency to emulsify, of a polymerized ester of the acrylic acid series and a small amount, sufficient to reduce the increased emulsifying tendency imparted to said oil by said polymerized ester, of an oil soluble aliphatic ester of a phosphorus acid.

2. A mineral oil composition comprising a mineral oil having dissolved therein a small amount, sufficient to improve the lubricating characteristics of said oil while imparting to said oil an increased tendency to emulsify, of a polymerized ester of the acrylic acid series and a small amount, sufficient to reduce the increased emulsifying tendency imparted to said oil by said polymerized ester, of an oil soluble aliphatic acid ester of a phosphorus acid.

3. A mineral oil composition comprising a mineral oil having dissolved therein a small amount, sufficient to improve the lubricating characteristics of said oil while substantially increasing the tendency of said oil to emulsify, of a polymerized ester of the acrylic acid series and a small amount, sufficient to reduce the increased emulsifying tendency imparted to said oil by said polymerized ester, of a mixture of oil soluble acid esters of a phosphorus acid.

4. A mineral oil composition comprising a mineral oil having dissolved therein a small amount, sufficient to improve the lubricating characteristics of said oil while imparting to said oil an increased tendency to emulsify, of a polymerized ester of an acrylic acid having as an alcohol residue a saturated hydrocarbon group of at least four carbon atoms and a small amount, sufficient to substantially reduce the increased emulsifying tendency imparted to said oil by said polymerized ester, of an oil soluble aliphatic ester of phosphoric acid.

5. A mineral oil composition comprising a mineral oil having dissolved therein a small amount, sufficient to improve the lubricating characteristics of said oil while imparting to said oil an increased tendency to emulsify, of a copolymer of esters of the acrylic acid series and a small amount, sufficient to substantially reduce the increased emulsifying tendency imparted to said oil by said copolymer, of an aliphatic ester of a phosphorus acid.

6. A mineral oil composition comprising a mineral oil having dissolved therein about 0.1% to about 5% by weight of a polymerized ester of the acrylic acid series, said polymerized ester being sufficient in said amount to improve the lubricating characteristics of said mineral oil while imparting to said oil a substantially increased tendency to emulsify, and about 0.02% to about 0.5% by weight of an aliphatic ester of a phosphorus acid, said aliphatic ester being sufficient in said amount to substantially decrease the increased emulsifying tendency imparted to said oil by said polymerized ester.

7. A mineral oil composition comprising a mineral oil having dissolved therein a small amount, sufficient to improve the lubricating characteristics of said oil while imparting to said oil an increased tendency to emulsify, of a poylmerized ester of an acrylic acid having as an alcohol residue a saturated hydrocarbon group of about four to about eighteen carbon atoms and a small amount, sufficient to substantially reduce the increased emulsifying tendency imparted to said oil by said polymerized ester, of an oil soluble alkyl ester of phosphoric acid.

8. A composition, as defined in claim 7, wherein the poylmerized ester is a poylmerized ester of methacrylic acid.

9. A composition, as defined in claim 7, wherein the oil-soluble alkyl ester is an oil-soluble alkyl acid ester of orthophosphoric acid.

10. A composition, as defined in claim 7, wherein the oil-soluble alkyl ester is lauryl acid phosphate.

11. A composition, as defined in claim 7, wherein the oil-soluble alkyl ester is tributyl phosphate.

ANTHONY J. REVUKAS.

REFERENCES CITED

The following references are of record in the file of this patent:

UNITED STATES PATENTS

| Number | Name | Date |
|---|---|---|
| 1,758,802 | Penn | May 13, 1930 |
| 2,392,530 | Hamilton et al. | Jan. 8, 1946 |
| 2,407,954 | Fenske et al. | Sept. 17, 1946 |
| 2,431,008 | Wright | Nov. 18, 1947 |
| 2,442,741 | Morgan et al. | June 1, 1948 |